United States Patent
Lee et al.

(10) Patent No.: US 10,540,088 B2
(45) Date of Patent: Jan. 21, 2020

(54) TOUCH SCREEN DEVICE CAPABLE OF EXECUTING EVENT BASED ON GESTURE COMBINATION AND OPERATING METHOD THEREOF

(71) Applicant: HANCOM FLEXCIL, INC., Seongnam-si, Gyeonggi-do (KR)

(72) Inventors: Changil Lee, Gwangju-si (KR); Hongshik Kim, Seoul (KR)

(73) Assignee: HANCOM FLEXCIL, INC., Seongnam-si, Gyeonggi-do (KR)

( * ) Notice: Subject to any disclaimer, the term of this patent is extended or adjusted under 35 U.S.C. 154(b) by 156 days.

(21) Appl. No.: 15/529,986

(22) PCT Filed: Aug. 8, 2016

(86) PCT No.: PCT/KR2016/008712
§ 371 (c)(1),
(2) Date: May 25, 2017

(87) PCT Pub. No.: WO2017/047929
PCT Pub. Date: Mar. 23, 2017

(65) Prior Publication Data
US 2017/0336963 A1 Nov. 23, 2017

(30) Foreign Application Priority Data

Sep. 17, 2015 (KR) .......................... 10-2015-0131459
Nov. 19, 2015 (KR) .......................... 10-2015-0162259

(51) Int. Cl.
G06F 3/0488 (2013.01)
G06F 3/01 (2006.01)
G06F 3/041 (2006.01)

(52) U.S. Cl.
CPC .......... G06F 3/04883 (2013.01); G06F 3/017 (2013.01); G06F 3/0412 (2013.01); G06F 3/0416 (2013.01); G06F 2203/04104 (2013.01)

(58) Field of Classification Search
CPC ........ G06F 2203/04104; G06F 3/0488–04886; G06F 3/0412–0418
See application file for complete search history.

(56) References Cited

U.S. PATENT DOCUMENTS

2005/0275638 A1* 12/2005 Kolmykov-Zotov ........................ G06F 3/04883 345/179
2008/0232690 A1* 9/2008 Saund ................. G06F 3/04883 382/187

(Continued)

FOREIGN PATENT DOCUMENTS

KR 10-1275040 B1 6/2013
KR 10-2014-0069359 A 6/2014

(Continued)

OTHER PUBLICATIONS

International Search Report in International Application No. PCT/KR2016/008712 dated Nov. 7, 2016.

Primary Examiner — David Tung
(74) Attorney, Agent, or Firm — Park, Kim & Suh, LLC

(57) ABSTRACT

A touch screen device capable of executing an event based on a gesture combination according to an exemplary embodiment of the present invention, and an operating method thereof maintain a command database storing a plurality of predetermined gesture combinations, in which two or more gestures are sequentially combined, and commands corresponding to the plurality of predetermined gesture combinations, and confirm a gesture combination according to two or more touch inputs when a user inputs the two or more touch inputs onto a touch screen with an (Continued)

interval within a predetermined time, extract a command corresponding to the gesture combination from the command database, and execute an event corresponding to the extracted command.

7 Claims, 3 Drawing Sheets

(56) References Cited

U.S. PATENT DOCUMENTS

| | | | |
|---|---|---|---|
| 2010/0020025 A1 | 1/2010 | Intuilab | |
| 2010/0149109 A1* | 6/2010 | Elias | G06F 3/04845 345/173 |
| 2011/0279379 A1* | 11/2011 | Morwing | G06F 3/0237 345/173 |
| 2012/0044179 A1* | 2/2012 | Hudson | G06F 3/04883 345/173 |
| 2012/0086662 A1 | 4/2012 | Ashikawa et al. | |
| 2012/0169663 A1* | 7/2012 | Kim | G06F 3/0418 345/174 |

FOREIGN PATENT DOCUMENTS

| | | |
|---|---|---|
| KR | 10-2014-0083302 A | 7/2014 |
| KR | 10-2014-0083303 A | 7/2014 |

* cited by examiner

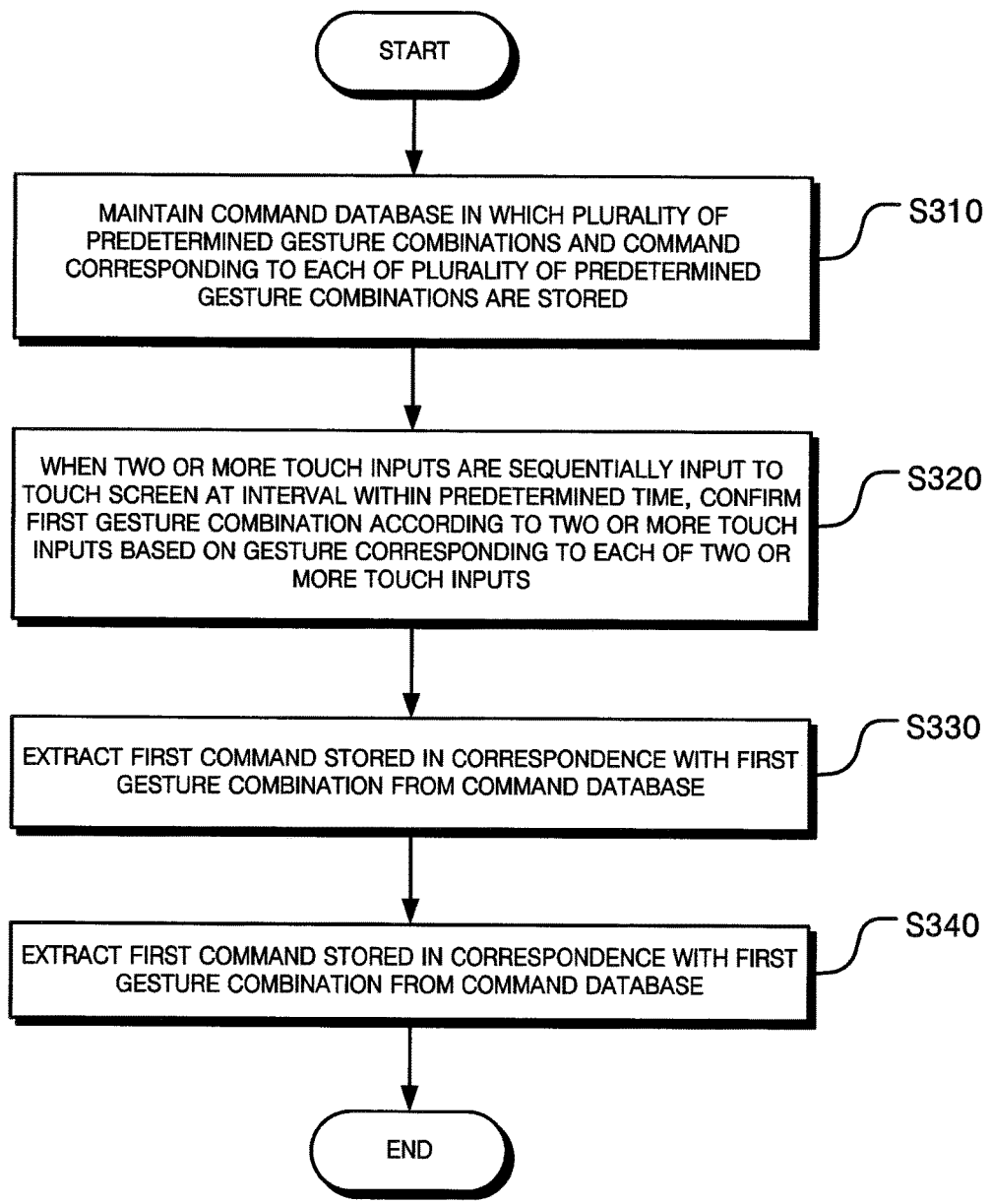

TOUCH SCREEN DEVICE CAPABLE OF EXECUTING EVENT BASED ON GESTURE COMBINATION AND OPERATING METHOD THEREOF

CROSS-REFERENCE TO RELATED APPLICATIONS

This application is the National Stage filing under 35 U.S.C. 371 of International Application No. PCT/KR2016/008712, filed on Aug. 8, 2016, which claims the benefits of Korea Patent Application No. 10-2015-0131469, filed on Sep. 17, 2015, and Korea Patent Application No. 10-2015-0162259, filed on Nov. 19, 2015, the contents of which are all hereby incorporated by reference herein in their entirety.

TECHNICAL FIELD

Exemplary embodiments of the present invention relate to a technology for a method of enabling a touch screen device to perform various control operations based on a touch input of a user in a touch screen device.

BACKGROUND ART

Recently, as portable smart devices, such as a smart phone or a tablet PC, are widely supplied, various applications utilized in the smart device are released.

Particularly, the smart devices are commonly mounted with touch screens, so that many applications providing interfaces based on a touch input of a user have appeared.

An operation performed by recognizing a touch input of a user in the smart device mounted with the touch screen includes a function of tracing a trace of a movement of a touch input of a user to enable a screen to be scrolled, a function of enlarging or contracting a screen based on a multi-touch input, or the like.

Commonly, there are many cases where touch screen devices equipped with the touch screens are designed to perform an operation according to a corresponding touch input based on one touch input by a user.

Accordingly, there is inevitably a limit in the number of functions of controlling the touch screen device based on a touch input applied by the user onto the touch screen, such as a scroll function or a page up/down function.

As a matter of course, functions of enlarging or contracting an image according to a corresponding multi-touch by recognizing the multi-touch applied to two contact points have been introduced, but the number of gesture operations according a touch input is not infinite, but is limited, so that a control method according to a touch input in the related art has a limit in providing many functions.

Accordingly, in order to for a user to execute a specific event in a touch screen device, the user needs to inconveniently enter a predetermined control menu provided by an application installed in the touch screen device, and then execute a command for executing a relevant event in the corresponding menu.

When a user is capable of executing various events provided by the touch screen device only by applying a specific touch input, like a use of a shortcut key, this may contribute to the convenience of the user, but as described above, the touch screen devices in the related art are developed to be capable of simply executing only a simple event corresponding to one touch input or a simple multi-touch, so that there is a limit in executing various events based on a touch input.

Accordingly, research on a touch interfacing method supporting a touch screen device to perform various operations based on a touch input applied by a user onto a touch screen in the touch screen device is needed.

SUMMARY OF THE INVENTION

Technical Problem

The present invention has been made in an effort to provide a touch screen device capable of executing an event based on a gesture combination, and an operating method thereof, which maintain a command database storing a plurality of predetermined gesture combinations, in which two or more gestures are sequentially combined, and commands corresponding to the plurality of predetermined gesture combinations, and confirm a gesture combination according to two or more touch inputs when a user inputs the two or more touch inputs onto a touch screen at an interval within a predetermined time, extract a command corresponding to the gesture combination from the command database, and execute an event corresponding to the extracted command to execute various events according to various two or more touch inputs, unlike an execution of an event corresponding to only one touch input by a touch screen device in the related art, thereby implementing many control operations for the touch screen only with the touch input like performing a function of a shortcut key.

Technical Solution

An exemplary embodiment of the present invention provides a touch screen device capable of executing an event based on a gesture combination, the touch screen device including: a command database in which a plurality of predetermined gesture combinations—the gesture combination means a combination in which two or more gestures are sequentially combined—and a command corresponding to each of the plurality of predetermined gesture combinations are stored; a touch confirming unit which, when two or more touch inputs are sequentially input to the touch screen within an interval within a predetermined time, confirms a first gesture combination according to the two or more touch inputs based on a gesture corresponding to each of the two or more touch inputs; a command extracting unit which extracts a first command stored in correspondence with the first gesture combination from the command database; and an event executing unit which executes an event according to the extracted first command.

Another exemplary embodiment of the present invention provides a method of operating a touch screen device capable of executing an event based on a gesture combination, the method including: maintaining a command database in which a plurality of predetermined gesture combinations—the gesture combination means a combination in which two or more gestures are sequentially combined—and a command corresponding to each of the plurality of predetermined gesture combinations are stored; when two or more touch inputs are sequentially input to the touch screen at an interval within a predetermined time, confirming a first gesture combination according to the two or more touch inputs based on a gesture corresponding to each of the two or more touch inputs; extracting a first command stored in correspondence with the first gesture combination from the command database; and executing an event according to the extracted first command.

Advantageous Effects

The touch screen device capable of executing the event based on the gesture combination, and the operating method thereof according to the present invention maintain a command database storing a plurality of predetermined gesture combinations, in which two or more gestures are sequentially combined, and commands corresponding to the plurality of predetermined gesture combinations, and confirm a gesture combination according to two or more touch inputs when a user inputs the two or more touch inputs onto a touch screen with an interval within a predetermined time, extract a command corresponding to the gesture combination from the command database, and execute an event corresponding to the extracted command to execute various events according to various two or more touch inputs, unlike an execution of an event corresponding to only one touch input by a touch screen device in the related art, thereby implementing many control operations for the touch screen only with the touch input like performing a function of a shortcut key and contributing to convenience of the user.

BRIEF DESCRIPTION OF THE DRAWINGS

FIG. 3 is a flowchart illustrating a method of operating a touch screen device capable of executing an event based on a gesture combination.

DETAILED DESCRIPTION

Figure 1:
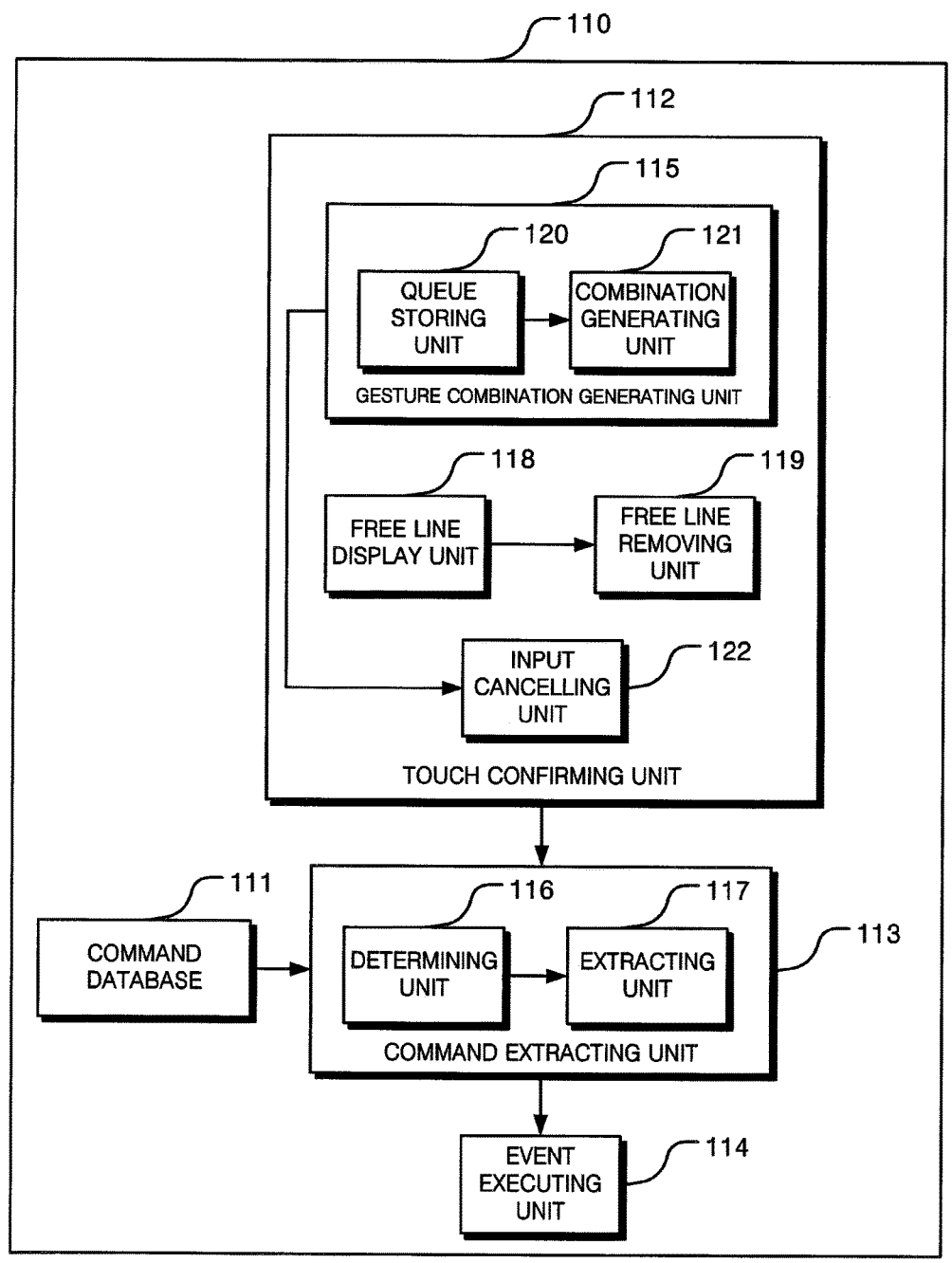
FIG. 1 is a diagram illustrating a structure of a touch screen device capable of executing an event based on a gesture combination according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

When a component is referred to as being "connected" or "accessed" to another component, it should be understood that the component may not only be directly connected or accessed to the other component, but intervening components may also be present. In contrast, when a component is referred to as being "directly connected to" or "directly accessed to" another component, it should be understood that there are no intervening component present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, components, and elements described in the specification or a combination thereof, and do not exclude a possibility of the existence or addition of one or more other characteristics, numbers, steps, operations, components, and elements, or a combination thereof in advance.

All terms used herein including technical or scientific terms have the same meanings as meanings which are generally understood by those skilled in the art unless they are differently defined. It should be construed that terms defined in a generally used dictionary have meanings matching those in the context of a related art, and the terms shall not be construed in ideal or excessively formal meanings unless they are clearly defined in the present application.

Hereinafter, exemplary embodiments of the present invention will be described in detail with reference to the accompanying drawings.

FIG. 1 is a diagram illustrating a structure of a touch screen device capable of executing an event based on a gesture combination according to an exemplary embodiment of the present invention.

Referring to FIG. 1, a touch screen device 110 capable of executing an event based on a gesture combination according to an exemplary embodiment of the present invention includes a command database 111, a touch confirming unit 112, a command extracting unit 113, and an event executing unit 114.

A plurality of predetermined gesture combinations and a command corresponding to each of the plurality of predetermined gesture combinations are stored in the command database 111.

In this case, according to the exemplary embodiment of the present invention, information represented in Table 1 below may be stored in the command database 111.

TABLE 1

| Plurality of predetermined gesture combinations | | |
|---|---|---|
| Name of gesture combination | Gesture combination method | Command |
| Gesture combination 1 | Gesture 1 + Gesture 2 | Command 1 |
| Gesture combination 2 | Gesture 3 + Gesture 4 + Gesture 5 | Command 2 |
| Gesture combination 3 | Gesture 1 + Gesture 2 + Gesture 4 | Command 3 |
| ... | ... | ... |

Herein, the gesture combination means a sequential combination of two or more gestures, and for example, a sequential combination of a gesture drawing a circle, a gesture shifting from a left side to a right side, and a gesture shifting from an upper side to a lower side.

In relation to this, in the exemplary embodiment of Table 1, "gesture combination 1" means a gesture in which "gesture 1" and "gesture 2" are sequentially combined, "gesture combination 2" means a gesture in which "gesture 3", "gesture 4", and "gesture 5 " are sequentially combined, and "gesture combination 3" means a gesture in which "gesture 1 ", "gesture 2", and "gesture 4" are sequentially combined.

When two or more touch inputs are sequentially input to the touch screen at an interval within a predetermined time, the touch confirming unit 112 confirms a first gesture combination according to the two or more touch inputs based on a gesture corresponding to each of the two or more touch inputs.

The command extracting unit 113 extracts a first command stored in correspondence with the first gesture combination from the command database 111.

The event executing unit 114 executes an event according to the extracted first command.

For example, when it is assumed that the predetermined time is "one second", and "touch input 1" and "touch input 2" are input to the touch screen at an interval within one second, the touch confirming unit 112 may confirm the first gesture combination according to "touch input 1" and "touch input 2" based on the gestures corresponding to "touch input 1" and "touch input 2".

When the gesture corresponding to "touch input 1" is "gesture 1" and the gesture corresponding to "touch input 2" is "gesture 2", the touch confirming unit 112 may confirm a gesture combination in which "gesture 1" and "gesture 2" are sequentially combined as the first gesture combination according to "touch input 1" and "touch input 2".

In this case, the command extracting unit 113 may extract "command 1" as the first command which is stored in correspondence with "gesture combination 1" that is the first gesture combination, in which "gesture 1" and "gesture 2" are sequentially combined, from the command database 111 represented in Table 1.

Then, the event executing unit 114 may control the touch screen device 110 capable of executing the event based on the gesture combination to perform an operation according to "command 1" by executing an event according to the extracted "command 1".

Finally, the touch screen device 110 capable of executing the event based on the gesture combination according to the exemplary embodiment of the present invention may maintain the command database 111 storing a plurality of predetermined gesture combinations, in which two or more gestures are sequentially combined, and commands corresponding to the plurality of predetermined gesture combinations, and confirm a gesture combination according to two or more touch inputs when a user inputs the two or more touch inputs onto a touch screen with an interval within a predetermined time, extract a command corresponding to the gesture combination from the command database 111, and execute an event corresponding to the extracted command to execute various events according to various two or more touch inputs, unlike an execution of an event corresponding to only one touch input by a touch screen device in the related art, thereby implementing many control operations for the touch screen device only with the touch input like performing a function of a shortcut key and contributing to convenience of the user.

According to the exemplary embodiment of the present invention, the touch confirming unit 112 may include a gesture combination generating unit 115, and the command extracting unit 113 may include a determining unit 116 and an extracting unit 117.

The gesture combination generating unit 115 tracks a trace of each touch input and generates gesture information corresponding to each touch input based on the trace of each touch input whenever the two or more touch inputs are sequentially input to the touch screen at the interval within the predetermined time, and generates the first gesture combination according to the two or more touch inputs based on the gesture information corresponding to each touch input.

In this case, when an additional touch input is not input within the predetermined time after the two or more touch inputs are sequentially input to the touch screen at the interval within the predetermined time, the determining unit 116 may determine whether the first gesture combination is present in the plurality of predetermined gesture combinations stored in the command database 111.

Then, when it is determined that the first gesture combination is present in the plurality of predetermined gesture combinations stored in the command database 111 the extracting unit 117 may extract the first command stored in correspondence with the first gesture combination from the command database 111.

According to the exemplary embodiment of the present invention, the touch confirming unit 112 may further include a free line display unit 118 and a free line removing unit 119.

The free line display unit 118 tracks a trace of each touch input, generates free lines according to the trace of each touch input, and displays the generated free lines on the touch screen whenever the two or more touch inputs are sequentially input to the touch screen at the interval within the predetermined time.

When the additional touch input is not input within the predetermined time after the two or more touch inputs are sequentially input to the touch screen at the interval within the predetermined time, the free line removing unit 119 removes the free lines displayed on the touch screen.

In relation to this, an operation of the touch screen device 110 capable of executing the event based on the gesture combination according to the present invention will be described in more detail with reference to FIG. 2.

Figure 2:
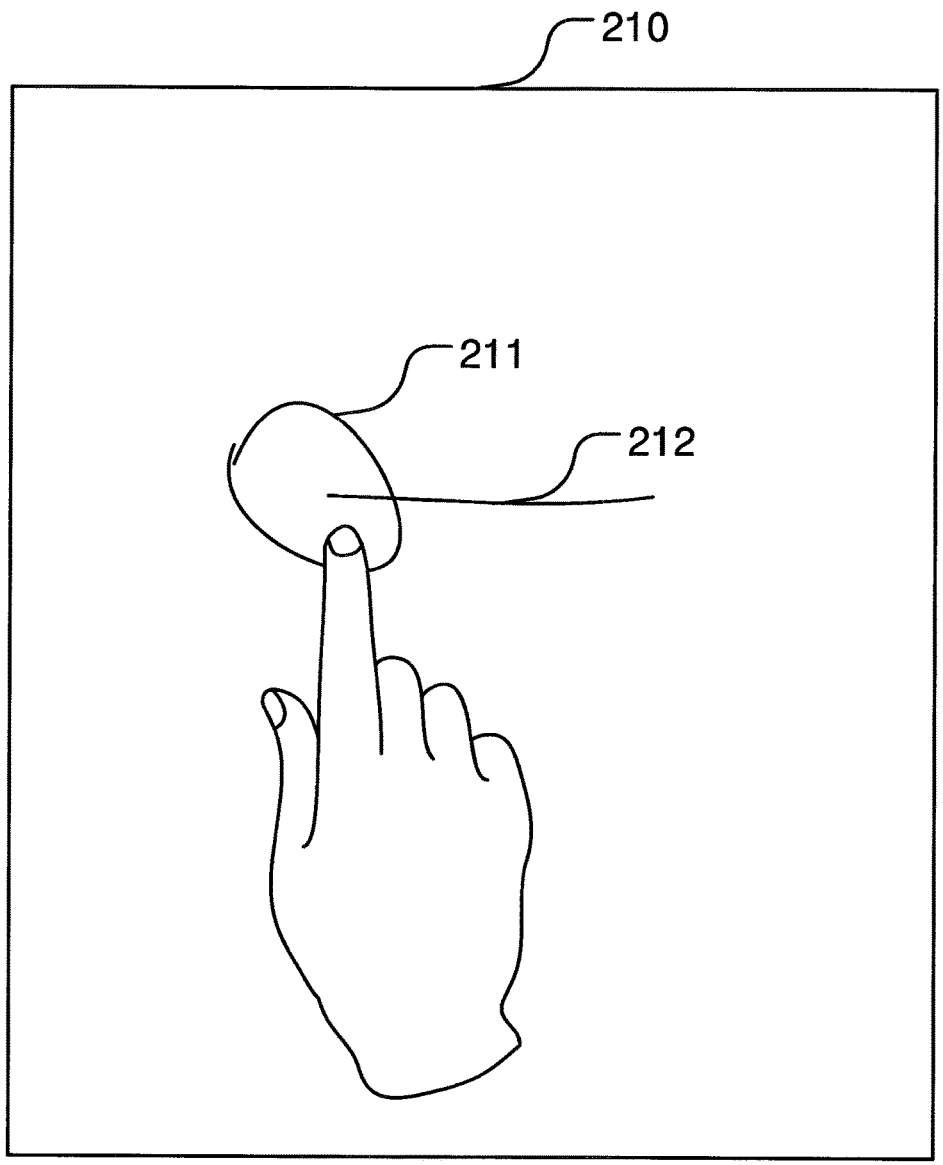
FIG. 2 is a diagram illustrating an operation of a touch screen device capable of executing an event based on a gesture combination according to an exemplary embodiment of the present invention.

FIG. 2 is a diagram illustrating an operation of the touch screen device 110 capable of executing the event based on the gesture combination according to the exemplary embodiment of the present invention.

First, it is assumed that a plurality of predetermined gesture combinations and a command corresponding to each of the plurality of predetermined gesture combinations are stored in the command database 111 as represented in Table 1.

In this case, when two or more touch inputs are sequentially input to a touch screen 210 at an interval within a predetermined time, the touch confirming unit 112 may confirm a first gesture combination according to the two or more touch inputs based on a gesture corresponding to each of the two or more touch inputs.

In relation to this, the gesture combination generating unit 115 may track a trace of each touch input and generate gesture information corresponding to each touch input based on the trace of each touch input whenever the two or more touch inputs are sequentially input to the touch screen 210 at the interval within the predetermined time.

In relation to this, when it is assumed that the predetermined time is "one second", and touch input 1 211 drawing a circle is input to the touch screen 210 and touch input 2 212 shifting from a left side to a right side is consecutively input within one second as illustrated in FIG. 2, the gesture combination generating unit 115 may track a trace of the touch input 1 211 when the touch input 1 211 is input to the touch screen 210, and generate gesture information informing "a gesture drawing a circle" as gesture information corresponding to the touch input 1 211 based on the trace of the touch input 1 211, and the gesture combination generating unit 115 may track a trace of the touch input 2 212 when the touch input 2 212 is input to the touch screen 210, and generate gesture information informing "a gesture shifting from the left side to the right side" as gesture information corresponding to the touch input 2 212 based on the trace of the touch input 2 212. Herein, for convenience of the description, "the gesture drawing the circle" will be called "gesture 1" and "the gesture shifting from the left side to the right side" will be called "gesture 2".

Then, the gesture combination generating unit 115 may generate a first gesture combination as the gesture combination according to the touch input 1 211 and the touch input 2 212 based on the information on "gesture 1" and "gesture 2", and in the present exemplary embodiment, the gesture combination generating unit 115 may generate "gesture combination 1" that is the gesture combination in which "gesture 1" and "gesture 2" are sequentially combined.

In this case, whenever the touch input 1 211 and the touch input2 212 are input to the touch screen 210 at an interval within one second, the free line display unit 118 may track traces of the touch input 1 211 and the touch input 2 212, and then generate a free line corresponding to the touch input 1 211 and a free line corresponding to the touch input 2 212, and display each free line on the touch screen 210 as illustrated in FIG. 2.

When the touch input 1 211 and the touch input 2 212 are input to the touch screen 210 at the interval within one second and an additional touch input is not input within one second, the determining unit 116 included in the command extracting unit 113 may determine whether "gesture combination 1" is present in the plurality of predetermined gesture combinations stored in the command database 111.

Simultaneously, when the touch input 1 211 and the touch input 2 212 are input to the touch screen 210 at the interval within one second and an additional touch input is not input within one second, the free line removing unit 119 may remove all of the free lines displayed on the touch screen 210.

As described above, the touch screen device 110 capable of executing the event based on the gesture combination according to the present invention includes the free line display unit 118 to enable the touch screen device to recognize the kind of touch input applied to the touch screen 210 by the user, and further includes the free line removing unit 119 to support the touch screen device 110 to recognize a time, at which two or more touch inputs are completely applied and a command is executed, when the free line is removed.

In the example of Table 1, "gesture combination 1" is present in the command database 111, so that the extracting unit 117 may extract "command 1" that is a command stored in correspondence with "gesture combination 1" from the command database 111.

Then, the event executing unit 114 may execute an event according to extracted "command 1".

According to the exemplary embodiment of the present invention, the gesture combination generating unit 115 may include a queue storing unit 120 which, whenever the two or more touch inputs are sequentially input to the touch screen at the interval within the predetermined time, tracks a trace of each touch input, generates gesture information corresponding to each touch input based on the trace of each touch input, and then sequentially stores gesture information corresponding to each touch input in a memory queue, and a combination generating unit 121 which, when the gesture information corresponding to each of the two or more touch inputs is stored in the memory queue, combines the gesture information corresponding to each of the two or more touch inputs stored in the memory queue in an order of the storage in the memory queue and generates the first gesture combination according to the two or more touch inputs.

In relation to this, in the exemplary embodiment of FIG. 2, the queue storing unit 120 may generate "gesture 1" that is gesture information corresponding to the touch input 1 211 and then store the generated "gesture 1" in the memory queue when the touch input1 211 is input to the touch screen 210, and may generate "gesture 2" that is gesture information corresponding to the touch input 2 212 and then additionally store the generated "gesture 2" in the memory queue when the touch input 2 212 is input to the touch screen 210.

Then, the combination generating unit 121 may combine information on "gesture 1" and "gesture 2" stored in the memory queue in the order of gesture 1" and "gesture 2" according to an order of the storage in the memory queue, and generate "gesture combination 1".

In this case, according to the exemplary embodiment of the present invention, the touch confirming unit 112 may further include an input cancelling unit 122.

Whenever a first cancel touch input corresponding to predetermined first cancel gesture information is input for executing a cancel command for the touch input at the interval within the predetermined time after the two or more touch inputs are sequentially input to the touch screen at the interval within the predetermined time, the input cancelling unit 122 may delete the gesture information corresponding to each of the two or more touch inputs stored in the memory queue one by one in an order opposite to the order, in which the gesture information corresponding to each of the two or more touch inputs is stored in the memory queue.

For example, like the exemplary embodiment illustrated in FIG. 2, in the state where information on "gesture 1" and "gesture 2" is sequentially stored in the memory queue according to the input of the touch input 1 211 and the touch input 2 212 to the touch screen 210 at the interval within one second, when a first cancel touch input corresponding to predetermined first cancel gesture information is input for executing a cancel command for the touch input within one second after the touch input 2 212 is input to the touch screen 210, the input cancelling unit 122 may delete the information on "gesture 2" from the memory queue based on the first cancel touch input.

Then, when the first cancel touch input is re-input within one second after the first cancel touch input is input to the touch screen 210, the input cancelling unit 122 may delete the information on "gesture 1" from the memory queue based on the re-input first cancel touch input.

When the user additionally inputs predetermined "touch input 3", not the first cancel touch input to the touch screen 210 within one second, after the information on "gesture 2" is deleted from the memory queue based on the first cancel touch input, the queue storing unit 120 may track a trace of the "touch input 3", generate gesture information corresponding to the "touch input 3" based on the trace of the "touch input 3", and then additionally store "gesture 3" that is the gesture information corresponding to the "touch input 3" in the memory queue. Then, the gesture information on the "gesture 1" and the "gesture 3" is stored in the memory queue.

Finally, when the user applies two or more touch inputs and desires to cancel a previously input touch input, the touch screen device 110 capable of executing the event based on the gesture combination according to the present invention supports the user to cancel the previously input touch inputs one by one by the method of applying the first cancel touch input to the touch screen 210, thereby supporting the user to correct a touch input itself for executing an event.

According to the exemplary embodiment of the present invention, when a second cancel touch input corresponding to predetermined second cancel gesture information is input for executing an input cancel command for the entire two or more touch inputs within the predetermined time after the two or more touch inputs are sequentially input to the touch screen at the interval within the predetermined time, the input cancelling unit 122 may delete all of the gesture information corresponding to the two or more touch inputs stored in the memory queue based on the second cancel touch input.

For example, like the exemplary embodiment illustrated in FIG. 2, in the state where the information on the "gesture 1" and he "gesture 2" is sequentially stored in the memory queue according to the input of the touch input 1 211 and the touch input 2 212 to the touch screen 210 at the interval within one second, when the second cancel touch input corresponding to predetermined second cancel gesture information is input for executing a cancel command for all of the touch inputs within one second after the touch input 2 212 is input to the touch screen 210, the input cancelling unit 122 may delete all of the information on the "gesture 1" and the "gesture 2" from the memory queue based on the second cancel touch input.

Accordingly, when the user desires to cancel all of the two or more touch inputs input by himself/herself, the user may cancel all of the two or more touch inputs only by simply inputting the second cancel touch input to the touch screen 210, and then apply touch inputs for newly executing an event again.

FIG. 3 is a flowchart illustrating a method of operating a touch screen device capable of executing an event based on a gesture combination.

In operation S310, a command database in which a plurality of predetermined gesture combinations (the gesture combination means a combination in which two or more gestures are sequentially combined) and a command corresponding to each of the plurality of predetermined gesture combinations are stored, is maintained.

In operation S320, when two or more touch inputs are sequentially input to a touch screen at an interval within a predetermined time, a first gesture combination according to the two or more touch inputs is confirmed based on a gesture corresponding to each of the two or more touch inputs.

In operation S330, a first command stored in correspondence with the first gesture combination is extracted from the command database.

In operation S340, an event according to the extracted first command is executed.

In this case, according to the exemplary embodiment of the resent invention, operation S320 may include an operation of tracking a trace of each touch input and generating gesture information corresponding to each touch input based on the trace of each touch input whenever the two or more touch inputs are sequentially input to the touch screen at the interval within the predetermined time, and generating the first gesture combination according to the two or more touch inputs based on the gesture information corresponding to each touch input.

In this case, operation S330 may include an operation of, when an additional touch input is not input within the predetermined time after the two or more touch inputs are sequentially input to the touch screen at the interval within the predetermined time, determining whether the first gesture combination is present in the plurality of predetermined gesture combinations stored in the command database, and an operation of, when it is determined that the first gesture combination is present in the plurality of predetermined gesture combinations stored in the command database, extracting the first command stored in correspondence with the first gesture combination from the command database.

According to the exemplary embodiment of the present invention, operation S320 may further include an operation of tracking a trace of each touch input, generating free lines according to the trace of each touch input, and displaying the generated free lines on the touch screen whenever the two or more touch inputs are sequentially input to the touch screen at the interval within the predetermined time, and an operation of removing the free lines displayed on the touch screen when the additional touch input is not input within the predetermined time after the two or more touch inputs are sequentially input to the touch screen at the interval within the predetermined time.

According to the exemplary embodiment of the present invention, the operation of generating the first gesture combination may include an operation of, whenever the two or more touch inputs are sequentially input to the touch screen at the interval within the predetermined time, tracking a trace of each touch input, generating gesture information corresponding to each touch input based on the trace of each touch input, and then sequentially storing gesture information corresponding to each touch input in a memory queue, and an operation of, when the gesture information corresponding to each of the two or more touch inputs is stored in the memory queue, combining the gesture information corresponding to each of the two or more touch inputs stored in the memory queue in an order of the storage in the memory queue and generating the first gesture combination according to the two or more touch inputs.

In this case, according to the exemplary embodiment of the present invention, operation S320 may further include an operation of, whenever a first cancel touch input corresponding to predetermined first cancel gesture information is input for executing a cancel command for the touch input at the interval within the predetermined time after the two or more touch inputs are sequentially input to the touch screen at the interval within the predetermined time, deleting the gesture information corresponding to each of the two or more touch inputs stored in the memory queue one by one in an order opposite to the order, in which the gesture information corresponding to each of the two or more touch inputs is stored in the memory queue.

According to the exemplary embodiment of the present invention, in the operation S320, when a second cancel touch input corresponding to predetermined second cancel gesture information is input for executing an input cancel command for the entire two or more touch inputs within the predetermined time after the two or more touch inputs are sequentially input to the touch screen at the interval within the predetermined time, all of the gesture information corresponding to the two or more touch inputs stored in the memory queue may be deleted based on the second cancel touch input.

In the foregoing, the method of operating the touch screen device capable of executing the event based on the gesture combination according to the exemplary embodiment of the present invention has been described with reference to FIG. 3. Herein, the method of operating the touch screen device capable of executing the event based on the gesture combination according to the exemplary embodiment of the present invention may correspond to the configuration of the operation of the touch screen device 110 capable of executing the event based on the gesture combination described with reference to FIGS. 1 and 2, so that a more detailed description thereof will be omitted.

The method of operating the touch screen device capable of executing the event based on the gesture combination according to the exemplary embodiment of the present invention may be implemented by a computer program stored in a storage medium for executing the method through a cooperation with a computer.

The method of operating the touch screen device capable of executing the event based on the gesture combination according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A touch screen device capable of executing an event based on a gesture combination, the touch screen device comprising:
    a command database storing a plurality of predetermined gesture combinations, each of the gesture combinations including two or more gestures sequentially combined and a command corresponding to each of the plurality of predetermined gesture combinations; and
    a processor configured to:
    when two or more touch inputs are sequentially input to the touch screen at an interval within a predetermined time and an additional touch input is not input within the predetermined time after the two or more touch inputs are input, confirm a first gesture combination according to the two or more touch inputs based on a gesture corresponding to each of the two or more touch inputs;
    extract a first command stored in correspondence with the first gesture combination from the command database;
    execute an event according to the extracted first command;
    track a trace of each touch input, generate free lines according to the trace of each touch input, and display the generated free lines on the touch screen whenever the two or more touch inputs are sequentially input to the touch screen at the interval within the predetermined time; and
    when the additional touch input is not input within the predetermined time after the two or more touch inputs are sequentially input to the touch screen, inform execution of the event according to the first command by removing the free lines displayed on the touch screen,
    wherein the processor is further configured to:
    whenever the two or more touch inputs are sequentially input to the touch screen at the interval within the predetermined time, track the trace of each touch input, generate gesture information corresponding to each touch input based on the trace of each touch input, and then sequentially store the gesture information corresponding to each touch input in a memory queue; and
    when the gesture information corresponding to each of the two or more touch inputs is stored in the memory queue, combine the gesture information corresponding to each of the two or more touch inputs stored in the memory queue in an order of the storage in the memory queue and generate the first gesture combination according to the two or more touch inputs,
    wherein the processor is further configured to:
    whenever a first cancel touch input corresponding to predetermined first cancel gesture information is input for executing a cancel command for the touch input at the interval within the predetermined time after the two or more touch inputs are sequentially input to the touch screen, delete the gesture information corresponding to each of the two or more touch inputs stored in the memory queue one by one in an order opposite to the order, in which the gesture information corresponding to each of the two or more touch inputs is stored in the memory queue, and
    wherein the processor is further configured to:
    when a second cancel touch input corresponding to predetermined second cancel gesture information is input for executing an input cancel command for the entire two or more touch inputs within the predetermined time after the two or more touch inputs are sequentially input to the touch screen, delete all of the gesture information corresponding to the two or more touch inputs stored in the memory queue based on the second cancel touch input.

2. The touch screen device of claim 1, wherein the processor is further configured to:
    track the trace of each touch input and generate the gesture information corresponding to each touch input based on the trace of each touch input whenever the two or more touch inputs are sequentially input to the touch screen at the interval within the predetermined time, and generate the first gesture combination according to the two or more touch inputs based on the gesture information corresponding to each touch input;
    when the additional touch input is not input within the predetermined time after the two or more touch inputs are sequentially input to the touch screen, determine whether the first gesture combination is present in the plurality of predetermined gesture combinations stored in the command database; and
    when it is determined that the first gesture combination is present in the plurality of predetermined gesture combinations stored in the command database, extract the first command stored in correspondence with the first gesture combination from the command database.

3. The touch screen device of claim 1, wherein the processor is further configured to maintain the displayed free lines when the additional touch input is input within the predetermined time after the two or more touch inputs are sequentially input to the touch screen.

4. A method of operating a touch screen device capable of executing an event based on a gesture combination, the method comprising:
 maintaining a command database storing a plurality of predetermined gesture combinations, each of the gesture combinations including two or more gestures sequentially combined and a command corresponding to each of the plurality of predetermined gesture combinations;
 when two or more touch inputs are sequentially input to the touch screen at an interval within a predetermined time and an additional touch input is not input within the predetermined time after the two or more touch inputs are input, confirming a first gesture combination according to the two or more touch inputs based on a gesture corresponding to each of the two or more touch inputs;
 extracting a first command stored in correspondence with the first gesture combination from the command database;
 executing an event according to the extracted first command;
 tracking a trace of each touch input, generating free lines according to the trace of each touch input, and displaying the generated free lines on the touch screen whenever the two or more touch inputs are sequentially input to the touch screen at the interval within the predetermined time; and
 when the additional touch input is not input within the predetermined time after the two or more touch inputs are sequentially input to the touch screen, informing execution of the event according to the first command by removing the free lines displayed on the touch screen,
 wherein the confirming of the first gesture combination includes:
 whenever the two or more touch inputs are sequentially input to the touch screen at the interval within the predetermined time, tracking the trace of each touch input, generating gesture information corresponding to each touch input based on the trace of each touch input, and then sequentially storing the gesture information corresponding to each touch input in a memory queue; and
 when the gesture information corresponding to each of the two or more touch inputs is stored in the memory queue, combining the gesture information corresponding to each of the two or more touch inputs stored in the memory queue in an order of the storage in the memory queue and generating the first gesture combination according to the two or more touch inputs,
 wherein the confirming of the first gesture combination further includes, whenever a first cancel touch input corresponding to predetermined first cancel gesture information is input for executing a cancel command for the touch input at the interval within the predetermined time after the two or more touch inputs are sequentially input to the touch screen, deleting the gesture information corresponding to each of the two or more touch inputs stored in the memory queue one by one in an order opposite to the order, in which the gesture information corresponding to each of the two or more touch inputs is stored in the memory queue, and
 wherein the confirming of the first gesture combination further includes, when a second cancel touch input corresponding to predetermined second cancel gesture information is input for executing an input cancel command for the entire two or more touch inputs within the predetermined time after the two or more touch inputs are sequentially input to the touch screen, deleting all of the gesture information corresponding to the two or more touch inputs stored in the memory queue.

5. The method of claim 4, wherein the confirming of the first gesture combination includes tracking the trace of each touch input and generating the gesture information corresponding to each touch input based on the trace of each touch input whenever the two or more touch inputs are sequentially input to the touch screen at the interval within the predetermined time, and generating the first gesture combination according to the two or more touch inputs based on the gesture information corresponding to each touch input, and
 the extracting of the first command includes:
 when the additional touch input is not input within the predetermined time after the two or more touch inputs are sequentially input to the touch screen, determining whether the first gesture combination is present in the plurality of predetermined gesture combinations stored in the command database; and
 when it is determined that the first gesture combination is present in the plurality of predetermined gesture combinations stored in the command database, extracting the first command stored in correspondence with the first gesture combination from the command database.

6. The method of claim 4, further comprising maintaining the displayed free lines when the additional touch input is input within the predetermined time after the two or more touch inputs are sequentially input to the touch screen.

7. A computer readable recording medium in which a program for executing a method of operating a touch screen device capable of executing an event based on a gesture combination is recorded, the method comprising:
 maintaining a command database storing a plurality of predetermined gesture combinations, each of the gesture combinations including two or more gestures sequentially combined and a command corresponding to each of the plurality of predetermined gesture combinations;
 when two or more touch inputs are sequentially input to the touch screen at an interval within a predetermined time and an additional touch input is not input within the predetermined time after the two or more touch inputs are input, confirming a first gesture combination according to the two or more touch inputs based on a gesture corresponding to each of the two or more touch inputs;
 extracting a first command stored in correspondence with the first gesture combination from the command database;
 executing an event according to the extracted first command;
 tracking a trace of each touch input, generating free lines according to the trace of each touch input, and displaying the generated free lines on the touch screen whenever the two or more touch inputs are sequentially input to the touch screen at the interval within the predetermined time; and when the additional touch input is not input within the predetermined time after the two or more touch inputs are sequentially input to the touch screen, informing execution of the event according to the first command by removing the free lines displayed on the touch screen, wherein the confirming of the first gesture combination includes:

whenever the two or more touch inputs are sequentially input to the touch screen at the interval within the predetermined time, tracking the trace of each touch input, generating gesture information corresponding to each touch input based on the trace of each touch input, and then sequentially storing the gesture information corresponding to each touch input in a memory queue; and when the gesture information corresponding to each of the two or more touch inputs is stored in the memory queue, combining the gesture information corresponding to each of the two or more touch inputs stored in the memory queue in an order of the storage in the memory queue and generating the first gesture combination according to the two or more touch inputs, wherein the confirming of the first gesture combination further includes, whenever a first cancel touch input corresponding to predetermined first cancel gesture information is input for executing a cancel command for the touch input at the interval within the predetermined time after the two or more touch inputs are sequentially input to the touch screen, deleting the gesture information corresponding to each of the two or more touch inputs stored in the memory queue one by one in an order opposite to the order, in which the gesture information corresponding to each of the two or more touch inputs is stored in the memory queue, and wherein the confirming of the first gesture combination further includes, when a second cancel touch input corresponding to predetermined second cancel gesture information is input for executing an input cancel command for the entire two or more touch inputs within the predetermined time after the two or more touch inputs are sequentially input to the touch screen, deleting all of the gesture information corresponding to the two or more touch inputs stored in the memory queue.

\* \* \* \* \*